United States Patent [19]

Henderson

[11] Patent Number: 5,612,864
[45] Date of Patent: Mar. 18, 1997

[54] APPARATUS AND METHOD FOR DETERMINING THE POSITION OF A WORK IMPLEMENT

[75] Inventor: Daniel E. Henderson, Washington, Ill.

[73] Assignee: Caterpillar Inc., Peoria, Ill.

[21] Appl. No.: 493,188

[22] Filed: Jun. 20, 1995

[51] Int. Cl.[6] .................................................. G05B 19/18
[52] U.S. Cl. ............................. 364/167.01; 364/424.07; 356/3.01
[58] Field of Search ........................ 364/167.01, 424.07, 364/559; 37/348; 356/1, 5, 73; 172/4.5

[56] References Cited

U.S. PATENT DOCUMENTS

| 4,672,564 | 6/1987 | Egli et al. ................................. 364/559 |
| 4,805,086 | 2/1989 | Nielsen et al. ....................... 364/167.01 |
| 4,807,131 | 2/1989 | Clegg .................................... 364/424.01 |
| 4,820,041 | 4/1989 | Davidson et al. ............................ 356/1 |
| 5,100,229 | 3/1992 | Lundberg et al. ............................ 356/1 |
| 5,144,317 | 9/1992 | Duddek et al. ........................... 342/357 |
| 5,359,521 | 10/1994 | Kyrtsos et al. .......................... 364/449 |
| 5,375,059 | 12/1994 | Kyrtsos et al. .......................... 364/449 |
| 5,375,663 | 12/1994 | Teach ........................................ 172/4.5 |
| 5,404,661 | 4/1995 | Sahm et al. ................................ 37/348 |
| 5,438,771 | 8/1995 | Sahm et al. ................................ 37/348 |

FOREIGN PATENT DOCUMENTS

2637625  4/1990  France.

Primary Examiner—Paul P. Gordon
Assistant Examiner—Monica Lewis
Attorney, Agent, or Firm—Alan J. Hickman

[57] ABSTRACT

An apparatus and method for determining the position of a work implement movably connected to a machine utilizes first and second electromagnetic radiation receiving devices connected to the work implement at predetermined spaced locations. A processor determines the first and second current coordinate positions of the first and second receiving devices in a site coordinate system based on position signals from the first and second receiving devices. The processor transforms the first and second points from a local coordinate system related to the machine to the site coordinate system using a plane passing through the first and second current coordinate positions and a mid-point located along a substantially straight line passing between first and second previously defined coordinate positions of the first and second receiving devices. The processor corrects the position of the first and second points in the site coordinate system based on sensed changes in the pitch of the implement.

22 Claims, 5 Drawing Sheets

Fig_2_

APPARATUS AND METHOD FOR DETERMINING THE POSITION OF A WORK IMPLEMENT

TECHNICAL FIELD

This invention relates to an apparatus and method for determining the position of a work implement in a site coordinate system and more particularly to a method and apparatus for determining the position of first and second end points in a local coordinate system relative to a supporting frame and transforming the position of the first and second points to a site coordinate system.

BACKGROUND ART

Machines, for example, motor graders, dozers, compactors, pavers, and profilers to name a just a few, are used for geographic surface altering operations. Such machines typically operate at construction sites which were previously manually surveyed, and staked according to construction site plans. During the process the construction site is frequently checked in order to confirm that the processed site meets the design specifications. This process requires large amounts of manual labor much of which is by highly trained personnel. Further, the machine operator must be highly trained in order to obtain the degree of accuracy required.

Laser systems have been in used in some applications to provide a reference for the operator to follow. A laser beam emitted by a laser positioned at a surveyed location on the site is swept over the site. This establishes a laser plane. A receiver on the machine receives the laser beam and indicates to the operator the elevational position of the beam relative to a location on the machine, such as the machine or implement. This information is used by the machine operator for machine controlling purposes. An example of one such system is shown in U.S. Pat. No. 4,807,131 dated Feb. 21, 1989, to Philip M. Clegg. This patent discloses measuring the elevational position of the grading blade relative to the laser plane and displaying on a monitor parameters such as target elevation, actual elevation, and an allowable range of error so that the operator can, in one mode of operation, adjust the blade position to be within tolerance of the target location.

Implements are normally adjustably connected to the machine frame so that the slope, pitch, and elevation of the work implement can be varied relative to the machine. When the laser receiver is mounted on the machine frame any change in the position of the work implement relative to the frame causes an unaccounted for change in the position of the work implement relative to the plane and the receiver. The information therefore provided to the operator is less than desirable and may not be used to any significant advantage. Placing a single laser receiver on the work implement eliminates this problem to the extent that the laser receiver moves with the work implement and is related to work implement position. However, any changes in tilt, pitch or rotation of the work implement relative to the laser plane are not compensated for and therefore the information provided is still not accurate. Placing two laser receivers on the implement permits the slope of the blade to be determined relative to the laser plane however this does not allow for the change in position of the implement caused by implement tipping (pitching).

Systems are known which use a constellation of satellites and a special receiver to determine by triangulation the position of a machine (actually the position of the receiver) in three space coordinates relative to a work site coordinate system. Such systems are normally referred to as a kinematic global positioning systems (GPS). Historically, such systems have not been widely accepted since the accuracy of position determination was less than satisfactory for certain applications. Further, slow processing time reduced the commercial feasibility of determining machine position in realtime. Over the past few years the accuracy of position determination has been improved and the speed of processing has been increased. Thus, the potential to determine the realtime position of a machine is now feasible for an assortment of applications including, for example, geographic surface altering machines.

It is desirable to utilize a global positioning system to determine the realtime position of the work implement, for example, the cutting edge of a geographic surface altering implement. By placing a GPS receiver on the work implement it would appear that the location of the cutting edge could be measured. However, after a closer look, the inability to deal with the dynamics of the work implement and accommodate variations in work implement orientation relative to the frame, for example, pitch of the work implement makes such a modification impossible.

Any GPS receiver mounted on a work implement must be spaced from the cutting edge because of the harsh environment in which the implement operates. Since the GPS receiver determines the position of the antenna of the receiver in space and not the position of the cutting edge, any variations in the orientation of the work implement, such as discussed above, reduces the possibility of being able to accurately determine the cutting edge position. For at least the above reasons placement of a GPS receiver on the work implement would not be considered.

In some applications the accuracy of determining the coordinate position of a work implement relative to a work site using a GPS receiver is less than required to meet acceptable standards. The measurement accuracy in the elevational direction of the site coordinate system is particularly important in applications where the end product is a finished surface, for example, a road way surface. Attempts to address this problem are being made but have not resulted in an accurate enough GPS.

The present invention is directed to overcoming one or more of the problems as set forth above.

DISCLOSURE OF THE INVENTION

In one aspect of the present invention, an apparatus for determining the position of a work implement movably connected to a machine includes a first receiving means for receiving electromagnetic radiation delivered from a plurality of remote locations and responsively producing a first position signal and a second receiving means for receiving electromagnetic radiation delivered from a plurality of remote locations and responsively producing a second position signal. The first receiving means is connected to the work implement at a preselected location relative to the work implement spaced from a first predetermined point location on the work implement. The second receiving means is connected to the work implement at a preselected location relative to the work implement spaced from a first predetermined point location on the work implement. The second receiving means is spaced a preselected distance from the first receiving means and the first point on the work implement is spaced a preselected distance from the second point on the work implement. A processing means is provided for receiving the first and second position signals, determining first and second current coordinate positions of the first and second receiving means in a site coordinate system, defining a plane passing through the first and second current coordinate positions and a mid-point located along a substantially straight line passing between first and second previously defined coordinate positions of the first and second receiving means in the site coordinate system, transforming the first and second points from a local coordinate system related to the machine to the site coordinate system using the plane as a reference, and recording the position of the first and second points in the site coordinate system. In another aspect of the present invention, the apparatus also includes means for sensing a change in the pitch angle of the work implement and determining a related current position of the first and second point locations on the work implement in the local coordinate system. The processing means converts the current position of the first and second points in the local coordinate system to the site coordinate system and records the current position of the first and second points in the site coordinate system.

In yet another aspect of the present invention, a method for determining the position of a work implement movably connected to a frame of a geographic surface altering machine is provided. The work implement has first and second spaced apart receiving means mounted thereon and first and second spaced apart points located thereon. The method comprises the steps of determining a current coordinate position of the first and second spaced apart receiving means in a site coordinate system; determining a position of each of the first and second points in a local coordinate system referenced to the frame; determining a mid point coordinate position located along a substantially straight line passing between a first and a second previously determined coordinate positions of the first and second spaced apart receiving means in the site coordinate system; determining a first vector extending between the first and second current coordinate positions and a second vector extending between the first current coordinate position and the midpoint position in the site coordinate system; and transforming the positions of the first and second points in the local coordinate system to the site coordinate system.

BEST MODE FOR CARRYING OUT THE INVENTION

Figure 1:
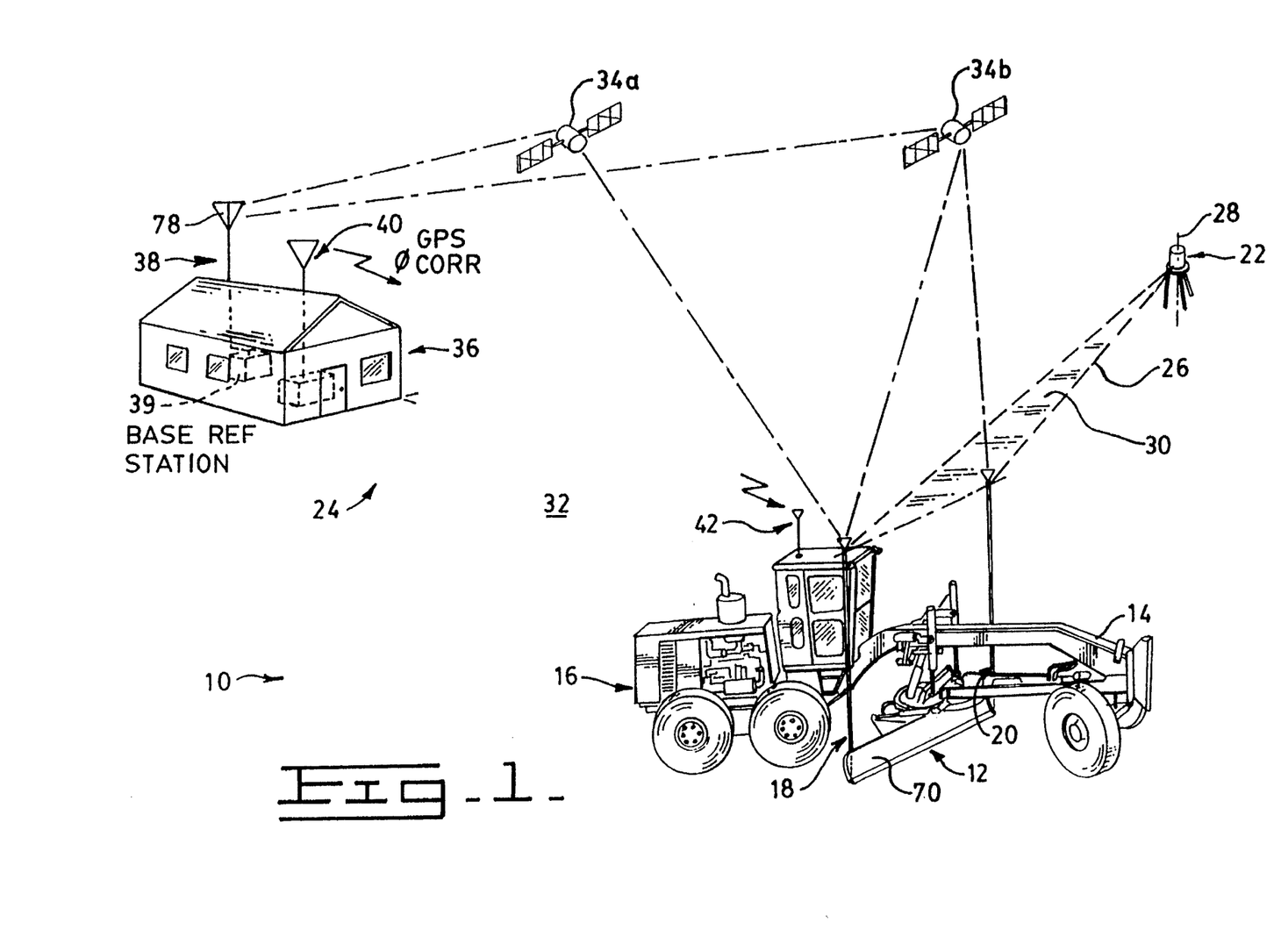
FIG. 1 is a diagrammatic isometric drawing of an embodiment of the present invention showing a combined laser and kinematic global positioning system for a geographic altering machine having a work implement.

With reference to the drawings and particularly FIG. 1, an apparatus 10 for determining the position of a work implement 12 of a geographic surface altering machine 16 is shown. The work implement 12, shown as an earth working blade, is controllably movably mounted on a frame 14 of a geographic surface altering machine 16, shown as a motor-grader. It is to be noted that other machines such as dozers, scrapers, compactors, pavers, profilers and the like, equipped with suitable surfacing altering implements, are equivalents and considered within the scope of the invention.

In the embodiment shown, the apparatus 10 optionally includes a laser scanner 22. The laser scanner 22 is adapted to deliver a low intensity laser beam 26 swept about a substantially vertical axis 28. The laser scanner 22 is positioned at a preselected coordinate location ("x", "y") within a surveyed area hereinafter referred to as a work site 32. The swept laser beam 26 defines a plane 30 at a predetermined elevational position along the vertical axis 28 and establishes an accurate elevational coordinate position "z".

The apparatus 10 includes a global positioning system (GPS) 24. The GPS 24 includes a constellation of satellites, two of which are shown at 34a and 34b. Preferably, four satellites in "view" of the machine 16 are selected because of favorable geometry for triangulation.

The global positioning system 24 includes a base station 36 and a reference receiving means 38 connected to the base station 36. The reference receiving means 38 is adapted to receive electromagnetic radiation delivered from a plurality of locations and responsively produce reference positioning signals. The reference receiving means 38 includes a GPS reference receiver 39. The base station 36 is located at a known, fixed position, at the work site 32. A transceiver 40 at the base station 36 and a transceiver 42 on the machine 16 provides an RF communication link between the machine 16 and the base station 36 over which reference position data is transferred. A base station processor (not shown) is used in determining the position of the base station relative to the center of the earth.

The global positioning system 24 further includes a first receiving means 18 for receiving electromagnetic radiation delivered from a plurality of remote locations and responsively producing a first position signal and a second receiving means 20 for receiving electromagnetic radiation delivered from said plurality of remote locations and responsively producing a second position signal.

Figure 2:
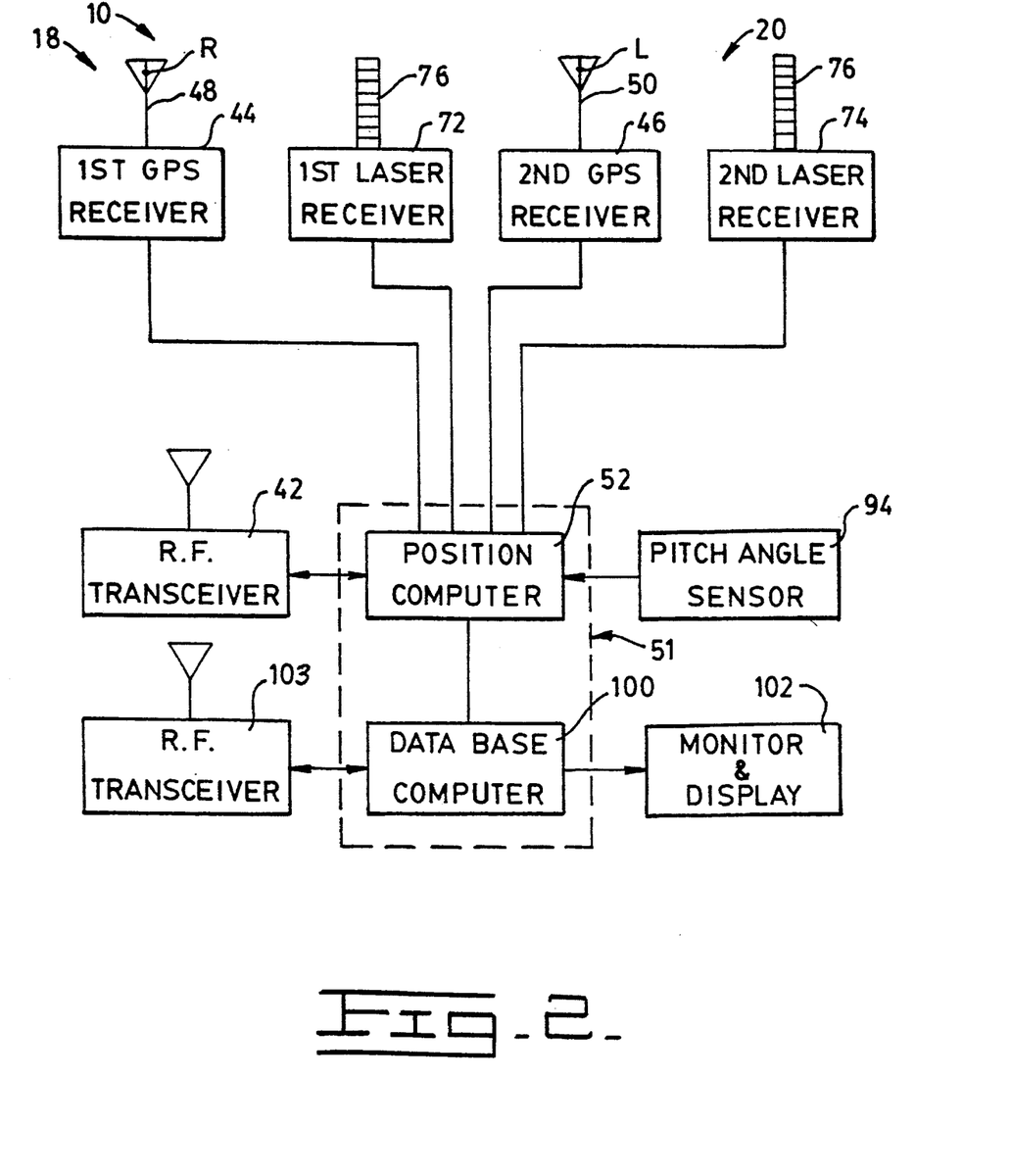
FIG. 2 is a diagrammatic block diagram of an apparatus for determining the position of a work implement and a control system for subsequently controlling the position of the work implement.

As best seen in FIGS. 1 and 2, the first receiving means 18 is connected at a first preselected location on the work implement 12 and the second receiving means 20 is connected at a second preselected location on the work implement 12. The first receiving means 18 includes a first GPS receiver 44 and the second receiving means 20 includes a second GPS receiver 46. The first and second GPS receivers each have an antenna 48,50 and a pre-amplifier (not shown). Position signals received by the first and second antennas 48,50 are amplified and delivered to the first and second receivers 44,46. The first and second receivers 44,46 decode the navigation signals and produce a pseudorange and a satellite position for each selected satellite. A processing means 51, including a position computer 52, calculates the position of the first and second receivers based on the pseudorange and satellite positions. In particular, the first and second receivers 44,46 determine the position of a receiving point location "R", "L" on the first and second antennas 48,50, respectively. The receiving points "R", "L" are the effective center of receipt of the GPS signals and are used in subsequent calculations. Global position systems such as this are known to those skilled in the art and will therefore not be discussed in any greater detail.

Figure 3:
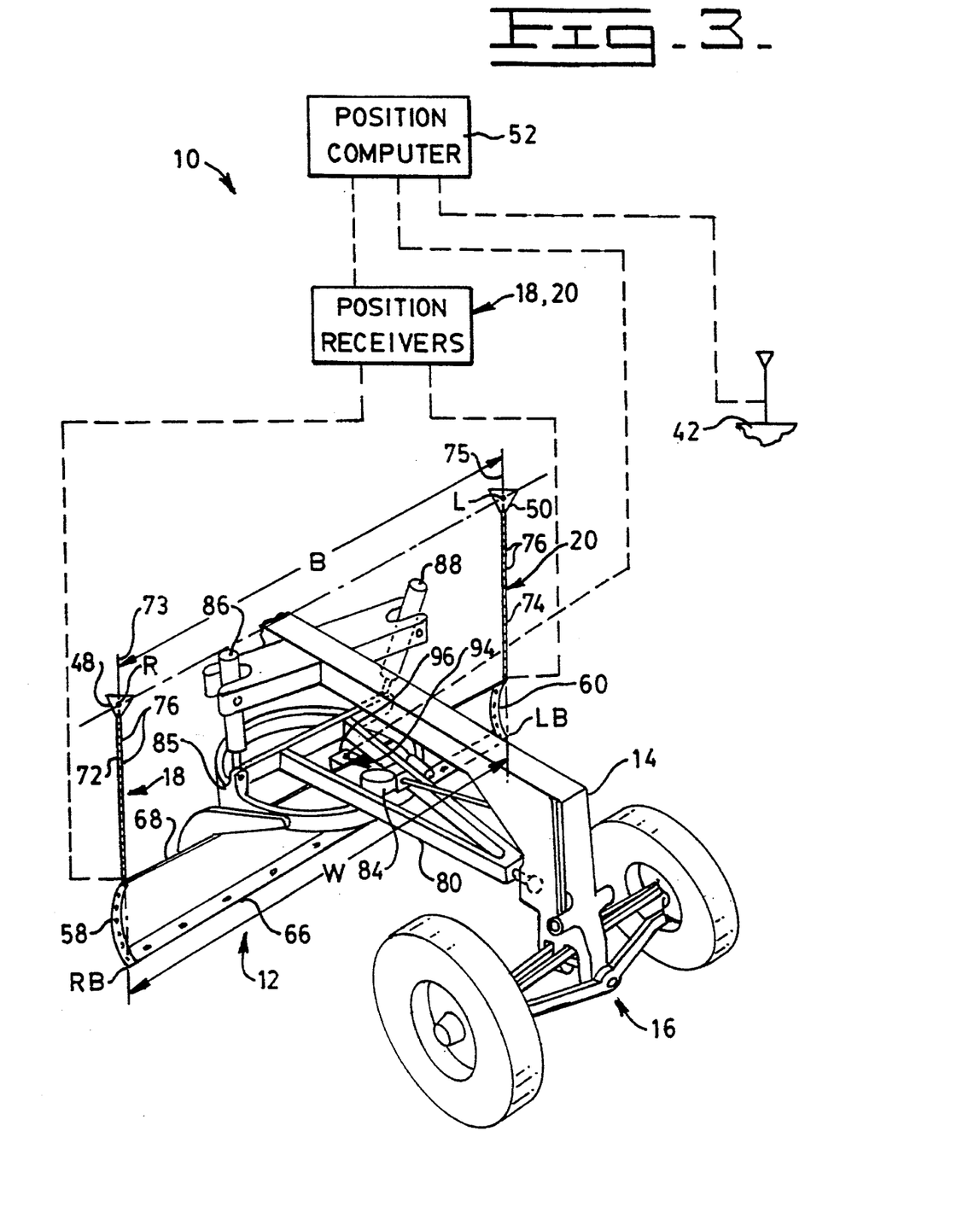
FIG. 3 is a diagrammatic schematic of the apparatus of FIG. 2 showing the control system in greater detail.

The implement 12, as shown in FIG. 3, includes an earth grading blade 70, having first and second sides 58,60, a cutting edge 66 and an upper edge 68. For reasons of simplicity, the following discussion will be with respect to this particular earthworking blade embodiment. However, it is to be recognized that other implements 12 may replace the blade without departing from the spirit of the invention. The first antenna 48 is mounted on the blade 70 adjacent the first side 58 and the second antenna 50 is mounted on the blade 70 adjacent the second side 60. The receiving points "R", "L" are spaced a preselected distance "W" apart. As shown, the particular distance "W" is substantially equal in magnitude to a distance between the first and second blade sides 58,60. The first and second receiving points "R", "L" are positioned with respect to first and second point locations "RB", "LB" which preferably lie along the cutting edge 66 of the blade 70. The first and second point locations "RB", "LB" are preferably at first and second corners of the blade 70, at the intersection of the first and second sides and the cutting edge 66, and a distance "B" apart. The distance "B" is preferably equal to distance "A". Placing the first and second antennas 48,50 (receiving points "R", "L") and the first and second points "RB", "LB" at these locations simplifies three dimensional space transformation calculations between the first and second receiving points "R", "L" and the first and second point locations "RB", "LB" of the blade 70. Preferably, the first and second receiving means 18,20 are located along first and second axial lines 73,75 extending perpendicular to the cutting edge 66 and parallel to each other. It should be recognized however that other locations may be selected without departing from the spirit of the invention.

Referring to FIGS. 1 and 2, the first and second receiving means 18,20 optionally include first and second laser receivers 72,74 connected to the blade at the aforementioned first and second predetermined spaced apart locations. Preferably, the first and second laser receivers are at the location of the first and second antennas 48,50, respectively. As best seen in FIG. 3, the first and second antennas 48,50 are mounted on one end portion of the first and second laser receivers 72,74, respectively, and the other end portion of the laser receivers 72,74 are connected to the blade 70 at the upper edge 68. The laser receivers 72,74 are incremental lazer receivers and include a plurality of linearly aligned photo receptors 76 and associated circuitry (not shown) for delivering an output signal representative of the particular receptor illuminated. The construction of laser receivers of this type are well known in the art and will therefore not be discussed in any greater detail. The first and second laser receivers 72,74 are provided to improve the accuracy of the implement 12 position measurement in the elevational direction and to supplement the measurement obtained from the global positioning system. The first and second laser receivers 72,74 are connected to the position computer 52. The laser receivers deliver output signals to the position computer 52 and the position computer determines the elevational coordinate position "z" of the blade 70 in three dimensional space relative to the particular work site. The first and second lines 73,75 extend along the length of the first and second laser receivers and pass through the receiving points "R" and "L".

Referring to FIG. 1. the reference receiver 39, located at the base station 36, receives signals from the constellation of GPS satellites. The base station computer (not shown) which is connected to the receiver 39 determines the position of the receiver 39 (antenna 78) with respect to the center of the Earth. The reference receiver 39 is used to make a "differential global positioning system". The first and second receivers 44,46 and the reference receiver 39 are commercially available and includes the antenna, preamplifier and receiver. The position and base station computers 52 include a commercially available microprocessor from Motorola, Inc., of Schaumburg, Ill.

Figure 4:
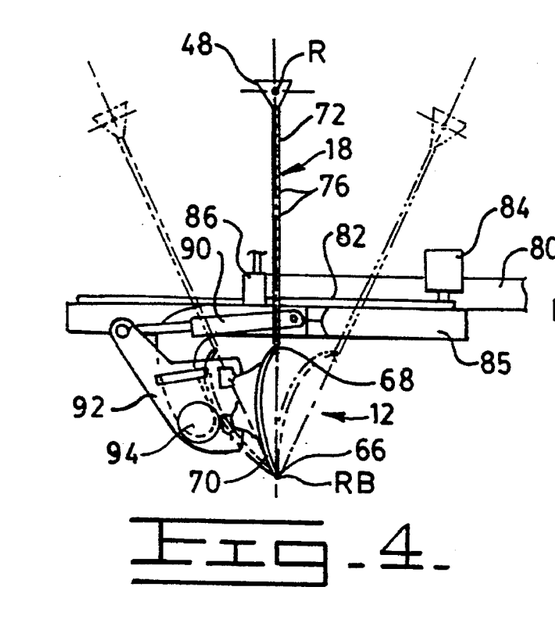
FIG. 4 is a diagrammatic side view of the work implement having first and second position receiving means mounted thereon.

Referring to FIGS. 3 and 4, the implement 12 is shown in greater detail. The blade 70 is movably connected to the frame 14 by a supporting mechanism 80. The supporting mechanism 80 includes a circle drive mechanism 82 having a selectively actuatable rotary drive motor 84 for rotating a circle 85 and the blade 70 connected thereto about an elevational axis located at the center of the circle 85 in a known manner.

A pair of selectively actuatable fluid operated lift jacks 86,88 are connected to and between the frame 14 and the supporting mechanism 80. The lift jacks 86,88 elevationally move the blade 70 relative to the frame 14. Simultaneous extension of the lift jacks 86,88 lowers the blade 70 and simultaneous retraction of lift jacks 86,88 raises the blade 70. Extension or retraction of either one of the lift jacks 86,88, or extension of one and retraction of the other of the lift jacks 86,88 results in tilting of the blade 70 relative to the frame 14 in directions transverse the direction of movement of the machine 16.

As shown in FIG. 4, a fluid operated tip jack 90 is connected to and between the supporting mechanism 80 and a bellcrank 92. The bellcrank 92 pivotally connects the blade 70 to the circle drive mechanism 82. The tip jack 90 is extensibly movable for tipping the bellcrank 92 about the pivotal connection. This results in tipping movement of the blade 70 in forward or rearward directions, as shown in phantom lines in FIG. 4, with the blade oriented transversely of the vehicle frame 14. It should be noted that the terms tip and pitch are used interchangeably and have the same meaning.

Figure 5:
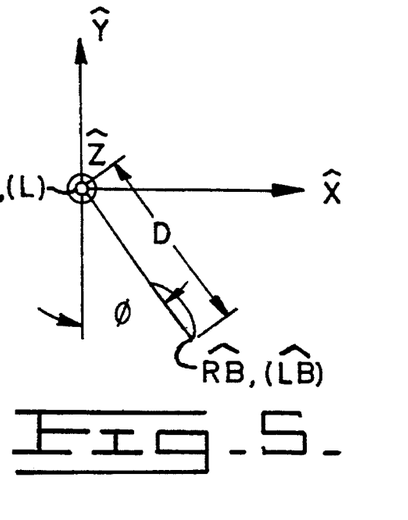
FIG. 5 is a diagrammatic view of the implement and receiving means of FIG. 4 shown pitched at an angle θ in a local coordinate system.

As best seen in FIGS. 3, 4 and 5, a sensing means 94 is provided for sensing a change in the pitch angle θ of the blade 70 and delivering a responsive pitch angle signal. The sensing means 94 includes any appropriate transducer 96 capable of sensing the tipped position of the blade about the bellcrank pivot axis. For example, a potentiometer, an encoder, a resolver, and the like. The transducer 96 is connected to the bellcrank and delivers the pitch angle signal to the position computer 52. The pitch angle signal may be either analog or digital. Should an analog signal be delivered an A/D converter is required to convert the signal for digital processing by the processing means 51. The position computer 52 determines a related current position of the first and second point locations $\hat{RB}$, $\hat{LB}$ on the work implement in a local coordinate system. The local coordinate system is a three dimensional coordinate system established relative to the frame 14 (supporting structure 80). As seen in FIG. 5, blade 70 is shown as being viewed from the second side 60 and looking down along the blade 70.

The processing means 51 receives the first and second position signals from the first and second receiving means 18,20 and determines first and second current coordinate positions "L","R", of the first and second receiving means 18,20, on a realtime basis, in a site coordinate system related to the work site 32 above. It is to be noted that the first and second signals may include the laser position signals as indicated above when additional accuracy in the elevational direction is required. The processing means 51 preferably disregards the GPS elevational component "z" when a laser position signal is provided.

Figure 6:
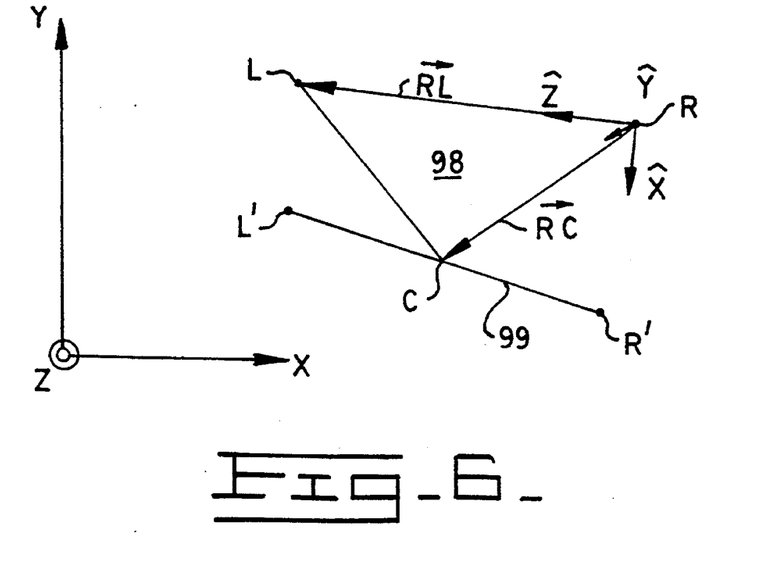
FIG. 6 shows in a site coordinate system, first and second vectors defining a plane, and unit vectors of the local coordinate system in the site coordinate system.

Referring to FIG. 6, the processing means 51, determines a plane 98 in space passing through the first and second current coordinate positions "L", "R" and a mid-point position "C", lying along a substantially straight line 99 passing between first and second previously defined coordinate positions "L'", "R'" of the first and second receiving means 18,20 in the site coordinate system. The most recent previously determined coordinate positions "L'", "R'" are stored in a memory (not shown) of the processing means 51. The effective mid-point position, "C", of the most recent blade orientation in work site coordinates $C_x$, $C_y$, $C_z$ is determined as follows:

$$C_x=(R'_x+L'_x)/2$$

$$C_y=(R'_y+L'_y)/2$$

$$C_z=(R'_z+L'_z)/2$$

As shown in FIG. 6, the plane 98 is defined by a first vector $\vec{RL}$ extending from the first current coordinate position "R" to the second current coordinate position "L", and a second vector $\vec{RC}$ extending from the first current coordinate position "R" and the midpoint "C" in the site coordinate system. The vectors $\vec{RL}$ and $\vec{RC}$ are determined as follows:

$$\vec{RL}=(L_x-R_x)i+(L_y-R_y)j+(L_z-R_z)k$$

$$\vec{RC}=(C_x-R_x)i+(C_y-R_y)j+(C_z-R_z)k$$

Unit vectors "i", "j", and "k" are in directions in the site coordinate system corresponding to the "x", "y", and "z" coordinate directions.

Referring to FIG. 5, knowing the current position of the first and second points $\hat{RB}$ and $\hat{LB}$ in the local coordinate system it has been determined possible to transform these point locations to the site coordinate system using the plane 98 as a reference. The position of the first and second points $\hat{RB}$ and $\hat{LB}$ in the local coordinate system relative to the frame 14 (supporting structure 80) is determined as follows:

$$\hat{RB}_x = \hat{LB}_x = D\sin\theta$$

$$\hat{RB}_y = \hat{LB}_y = -D\cos\theta$$

$$\hat{RB}_z = 0$$

$$\hat{LB}_z = W$$

where:

D=distance from the first and second receiving points R, L of the first and second receiving means 18,20 to the first and second point locations RB, LB, respectively, of the blade 70, θ=tip (pitch) angle of the blade (0=no tip, Π/2=maximum tip angle), and W=length of the cutting edge (distance between first and second sides 58,60).

The current positions of the first and second points $\hat{RB}$ and $\hat{LB}$ in the local coordinate system are determined during initialization of the apparatus, for example such as by switching the apparatus 10 to an "on" position to activate the receiving means 18,20, the processing means 51 and the pitch angle sensor 94. Subsequent determination of the positions of the first and second points $\hat{RB}$ and $\hat{LB}$ in the local coordinate system are updated when there is a change in the tip angle θ as sensed by the sensing means 94. This is achieved by the processing means 51 comparing the current pitch angle to a previously sensed pitch angle θ' and determining the current previous sensed stored position of the first and second points $\hat{RB}$ and $\hat{LB}$, stored in the memory thereof (not shown), and updating the information to the current position of the first and second points $\hat{RB}$ and $\hat{LB}$ in the local coordinate system.

The processing means 51 calculates the definitions of the local coordinate system unit vectors $\hat{x}$, $\hat{y}$ and $\hat{z}$ in terms of the site coordinate system unit vectors for each of the first and second points as follows:

$$\hat{y}=(\vec{RL}\times\vec{RC})/|\vec{RL}\times\vec{RC}|=v12i+v22j+v32k$$

$$\hat{z}=\vec{RL}/|\vec{RL}|=v_{13}i+v_{23}j+v_{33}k$$

$$\hat{x}=\hat{y}\times\hat{z}=v_{11}i+v_{21}j+v_{31}K$$

where for vectors $\vec{a}$ and $\vec{b}$, $\vec{a}\times\vec{b}$ represents the vector cross product and $|\vec{a}|$ represents the magnitude of the $\vec{a}$ vector.

The processing means 51 converts the current first and second local point positions $\hat{RB}$, $\hat{LB}$ from the local coordinate system to the site coordinate system RB, LB, respectively, and records the position of the first and second points RB, LB in the site coordinate system. Transformation of the first and second local point positions to the site coordinate system is determined in the following manner:

RB=V$\hat{RB}$

LB=V$\hat{LB}$ where V is the following matrix:

$$V=\begin{matrix} v11 & v12 & v31 & R_x \\ v21 & v22 & v23 & R_y \\ v31 & v31 & v33 & R_z \\ 0 & 0 & 0 & 1 \end{matrix}$$

where:

$$\hat{RB}=[\hat{RB}_x, \hat{RB}_y, \hat{RB}_z, 1]^T$$

$$RB=[RB_x, RB_y, RB_z, 1]^T$$

and similarly:

$$\hat{LB}=[\hat{LB}_x, \hat{LB}_y, \hat{LB}_z, 1]^T$$

$$LB=[LB_x, LB_y, LB_z, 1]^T$$

The vectors at RB and LB contain the coordinates of the first and second point locations RB and LB on the blade 70.

Referring to FIG. 2, the processing means 51 includes a database computer 100, of any suitable type, for example an IBM personal computer having an Intel 486 microprocessor, and adequate memory is connected to the position computer 52. The database computer 100 receives signals from the position computer 52 and updates in real time the current coordinate position of the first and second point locations RB, LB on the blade 70 within the work site as the machine 16 traverses the work site. The database computer 100 is also connected to a transceiver 103. The transceiver 103 is mounted on the machine 16 and in radio frequency transmission communication with the transceiver 40 at the base station 36. The transceiver 40 is connected to a landbase computer (not shown) located at the base station 36. The transceiver 40 communicates with the transceiver 103 and transfers data between the database computer 100 and the landbase computer. Data such as machine position, implement position, changes to the earth's topography and the like are transmitted therebetween. For example, changes made to the earth by the implement 12 during operation of the machine 16 are updated in real time in the position computer 52 located on the machine 16, based on the tracking of the first and second points RB, LB in the site coordinate system. Information such as this is transmitted to update the landbase computer to update the site map retained therein.

A monitor 102 of any suitable commercially available construction for example, a liquid crystal display, a cathode ray tube, or other suitable device capable of displaying information, is connected to the database computer 100. The database computer 100 delivers signals to the monitor 102 which displays pictorially or graphically the current position of the blade relative to the work site. The display is preferably a two dimension elevational crossection of the work site showing the blade in transverse elevation as seen in FIG. 4. However, a three dimensional representation of the blade 70 in three dimensional space is within the scope of the invention.

Digitized plans or models of the actual work site, as previously determined by a topographic survey, may be loaded into the database computer 100. A digitized plan or model of the desired work site, as drafted by an architect, may also be loaded into the database computer 100. The actual work site data is updated in real time based on the position of the first and second point locations RB, LB, as determined above. The database being dynamic facilitates real-time tracking of the first and second point locations RB, LB and the area of the earth's surface being altered by the blade 70 as the blade traverses the work site. A responsive signal is delivered from the database computer 100 to the monitor 102 and the current position of the blade 70, the actual work site, as altered, and the desired work site elevation is displayed on the monitor 102.

Figure 7:
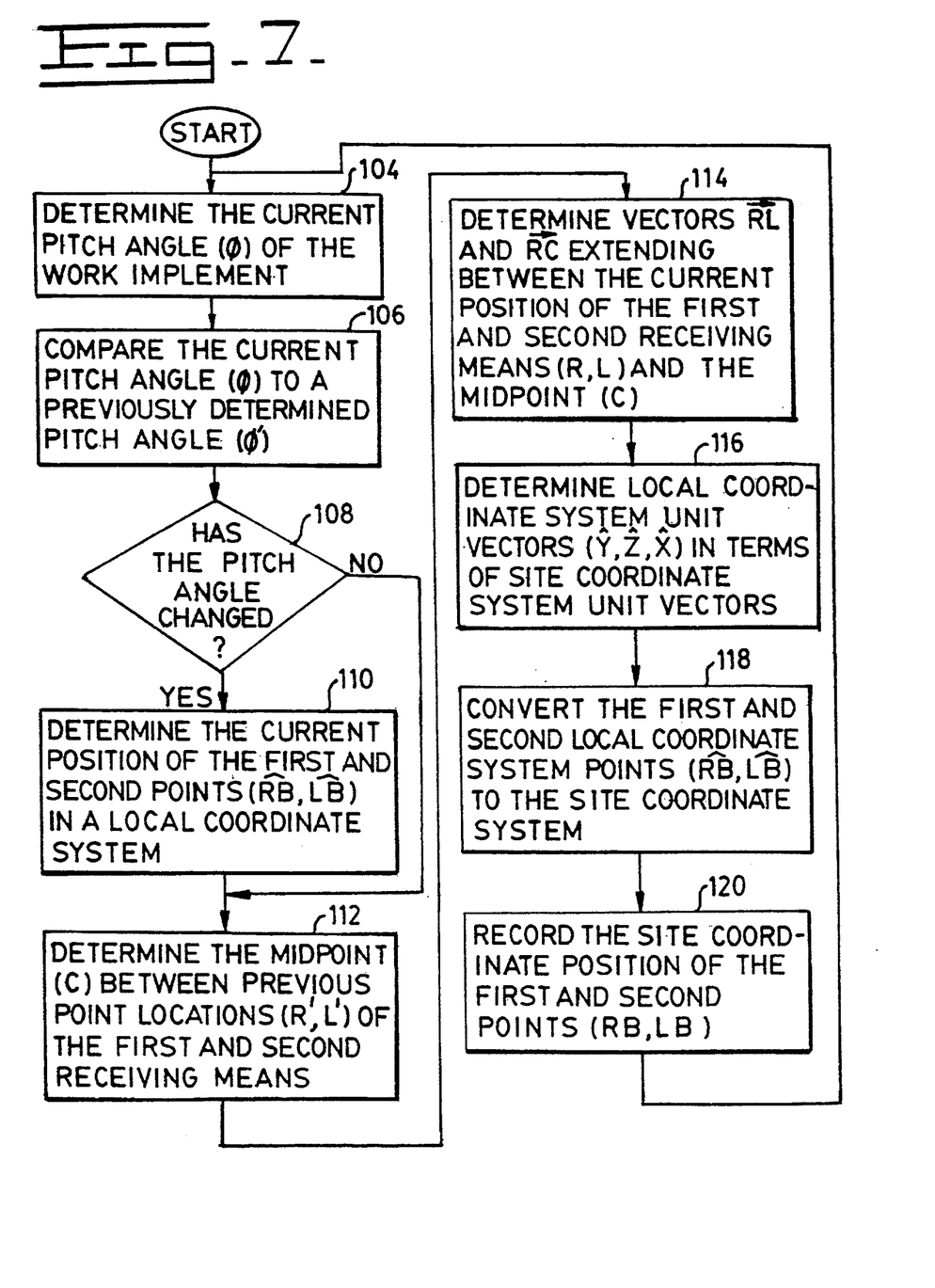
FIG. 7 is a flow chart showing the logic involved in transforming points on the blade from the local to a site coordinate system.

Referring to FIG. 7, a flow chart depicting a method for determining the position of the work implement 12 in the site coordinate system is shown in substantial detail. The method utilizes the analysis as set forth in the above description and applies it in a logical sequence for purposes of monitoring and when appropriate for controlling the implement 12. The steps shown in boxes 104–120 are performed by the processing means 51 with the results being displayed as discussed above on the monitor 102 as long as the system is activated, the control switch (not shown) in the "on" position.

As shown in box 104, the step of determining the current pitch angle θ of the work implement 12 is required during initialization and subsequent operation of the apparatus 10. This step includes receiving a signal from the sensing means 94, determining the current pitch angle θ of the work implement 12 relative to the frame 14 in the local coordinate system. The pitch angle θ is determined by the processing means 51, based on the signal received and stored in memory as a previously determined pitch angle θ'. Such pitch angle calculations are conventional and well known to those skilled in the art.

In box 106, the processing means 51 compares the current pitch angle θ to the previously determined pitch angle θ'. If there is a change in the pitch angle θ, decision box 108, the processing means will carry out the step set forth in box 110. It is to be recognized that the steps indicated by boxes 104–108 are equivalent to the single step of sensing a change in the pitch angle of the work implement relative to the frame 14 (supporting mechanism 80) and delivering a responsive pitch angle signal to the processing means 51 for further processing (such as shown in boxes 110–118). Any commercially available pitch angle sensing device capable of delivering an analog or digitally coded signal would be suitable for this purpose.

If there is no change in the pitch angle θ, for example, based on the above comparison, step 110 is bypassed and the calculation in box 112 is performed. As know to those skilled in the art, the comparison associated with the logic of boxes 106 and 108 may be achieved in software subroutines associated with a computer or in a comparitor circuit of well known construction having discrete electronic components.

Referring to box 110, the current position of the first and second points $\hat{RB}$ and $\hat{LB}$ in the local coordinate system relative to the frame 14 are calculated each time there is a change in the pitch angle θ. These calculations are performed by the processing means 51 in accordance with the equations set forth above. It should be noted that the comparison may be made at a predetermined fixed frequency, for example one time each second, or when the implement has been moved by the vehicle operator.

In box 112, the processing means 51 determines a mid point coordinate position "C" ($C_x$, $C_y$, $C_z$) located along a substantially straight line passing between the first and a second previously determined coordinate positions "L'" and "R'" of the first and second spaced apart receiving means 18,20 in the site coordinate system as set forth in the above analysis. The previously determined coordinate positions "L'" and "R'", stored in memory of the processing means 51 were based on the global positioning estimates and laser positioning, where appropriate.

The processing means 51 calculates the first vector $\overrightarrow{RL}$ extending between the first current coordinate point position "R" and the second current coordinate point position "L" and a second vector $\overrightarrow{RC}$ extending from the first current coordinate position "R" and the midpoint "C" in the site coordinate system. For details concerning this calculation references is made to the detailed description above.

Having determined the vector $\overrightarrow{RL}$ arrow and $\overrightarrow{RC}$ the processing means 51, box 116, defines the local coordinate systems unit vectors, $\hat{x}$, $\hat{y}$ and $\hat{z}$ each in terms of the site coordinate system unit vectors i, j, k. For a detailed explanation see the above related analysis.

Knowing each of the local coordinate systems unit vectors, $\hat{x}$, $\hat{y}$, $\hat{z}$ in terms of the site coordinate system unit vectors i, j, k the processing means 51 is able to convert the first and second local coordinate system points $\hat{RB}$ and $\hat{LB}$ to first and second site coordinate system points RB and LB. For a detailed disclosure of this analysis reference is made to box 118 and the above related description.

Upon completion of the transformation, the first and second locations RB, LB in the site coordinate system are recorded for future reference and use. In some applications the location of the first and second points RB, LB in the site coordinate system are stored in memory, on disc, or in the form of a paper record. In other applications the information is displayed pictorially, graphically or numerically on the monitor 102. In yet other applications this information is applied to implement automatic or semi-automatic implement position control.

INDUSTRIAL APPLICABILITY

With reference to the drawings and in operation, the particular surface altering machine 16, shown as a motor-grader but not limited thereto, is shown traversing an underlying roadway with the blade 70 positioned at a particular location relative to the frame 14 in order to grade the underlying road surface at, for example, a particular slope. During the grading operation it is common for the vehicle operator to change the pitch of the blade 70 in order to cause different earth grading and earth spreading characteristics. Changing the pitch of the blade 70 changes the position of the first and second points RB, LB in three dimensional space relative to the point locations R, L of the first and second antennas of the first and second receiving means 18,20, respectively. In order to compensate for this relative change it is necessary to determine the amount of the change in pitch angle θ and then correct the position of the first and second point locations RB, LB in the three dimensional site coordinate system.

As the machine traverses the underlying terrain and performs the geographic surface alteration of the earth, the position of the first and second points R, L of the first and second receiving means 18,20 is determined in three dimensional space in the site coordinate system and a responsive signal is delivered to the processing means 51 for further processing. Since the first and second point locations RB, LB of the blade 70 in three dimensional space in the site coordinate system is more significant and of more value to the vehicle operator than the first and second point locations $\hat{RB}$ and $\hat{LB}$ in the local coordinate system or the first and second points R, L, a transformation of the relative point locations is desirable. The operator utilizes the information displayed on the monitor 102 to assist in controlling the accuracy of blade 70 placement and for the purpose of improving the overall efficiency of operation related to cutting, filling, grading, planing and other surface altering related activities. Also, as the blade 70 alters the geographic surface, the blade 70 position is tracked. This tracking results in an update of the original topographic information contained in the database computer 100. This information is off loaded to the landbase computer. For example, the tracked realtime position of the blade 70 in the site coordinate system determines the current topography of the work site 32 as compared to the original topography of the work site 32 and the desired finished topography of the work site 32. Ideally, the original, desired, and current topography are recorded and displayed on the monitor 102.

Transformation of the first and second points $\hat{RB}$ and $\hat{LB}$ in the local coordinate system to the site coordinate system RB and LB is achieved by the apparatus 10 and in accordance with the method discussed above. This transformation improves the accuracy of implement 12 position determination and facilitates the use of such information for accurate implement control.

Other aspects, objects and advantages of the present invention can be obtained from a study of the drawings, the disclosure and the appended claims.

I claim:

1. An apparatus for determining the position of a work implement movably connected to a machine, comprising:

first receiving means for receiving electromagnetic radiation delivered from a plurality of remote locations and responsively producing a first position signal, said first receiving means being connected to said work implement and being at a first preselected location relative to said work implement spaced from a first point location on the work implement;

second receiving means for receiving electromagnetic radiation delivered from said plurality of remote locations and responsively producing a second position signal, said second receiving means being connected to said work implement and being at a preselected second location relative to said work implement spaced from a second point location on the work implement, said second means being spaced a preselected distance from said first means and said first point on the work implement being spaced a preselected distance from said second point on the work implement;

processing means for receiving said first and second position signals, determining first and second current coordinate positions of the first and second receiving means in a site coordinate system, defining a plane passing through the first and second current coordinate positions and a mid-point located along a substantially straight line passing between first and second previously defined coordinate positions of the first and second receiving means in the site coordinate system, transforming the first and second points from a local coordinate system related to the machine to the site coordinate system using said plane as a reference, and recording the position of the first and second points in the site coordinate system.

2. An apparatus, as set forth in claim 1, including means for sensing a change in the pitch angle of the work implement and determining a related current position of the first and second point locations on the work implement in the local coordinate system.

3. An apparatus, as set forth in claim 2, wherein said processing means converting the current position of the first and second points in the local coordinate system to the site coordinate system and recording the current position of the first and second points in the site coordinate system.

4. An apparatus, as set forth in claim 1, wherein said machine has a frame and including a pitch angle sensor connected to and responsive to tipping movement of the work implement relative to the frame, said pitch angle sensor delivering a pitch angle signal representative of the pitch angle of the work implement relative to the frame.

5. An apparatus, as set forth in claim 4, wherein said processing means receiving said pitch angle signal comparing the current pitch angle to a previously sensed pitch angle and determining the current position of the first and second points on the work implement in a local coordinate system in response to a change between the current and previously sensed pitch angle of the work implement.

6. An apparatus, as set forth in claim 5, wherein said processing means converting the current position of the first and second points in the local coordinate system to the site coordinate system and recording the current position of the first and second points in the site coordinate system.

7. An apparatus, as set forth in claim 1, wherein the plane passing through the first and second current coordinate positions and the mid-point is defined by a first vector extending from the first current coordinate position to the second current coordinate position and a second vector extending from the first current coordinate position to the midpoint.

8. An apparatus, as set forth in claim 7, wherein transforming the first and second points in the local coordinate system to the site coordinate system includes:

defining local coordinate system unit vectors for each of the first and second points in terms of site coordinate system unit vectors; and converting the first and second point positions of the local coordinate system to the site coordinate system using a cross product of vectors determined from the local coordinate unit vectors defined in terms of the site coordinate system unit vectors.

9. An apparatus, as set forth in claim 1, wherein said first and second receiving means each include a global position receiver.

10. An apparatus, as set forth in claim 9, wherein said first and second receiving means each include a laser position receiver.

11. An apparatus, as set forth in claim 10, wherein said laser position receiver of the first receiving means being mounted on said implement at said first location, said laser position receiver of the second receiving means being mounted on the implement at said second location, said global position receiver of the first means being connected to the laser position receiver of the first means, and said global position receiver of the second means being connected to the laser position receiver of the second means.

12. An apparatus, as set forth in claim 11, wherein the global position receivers measure the coordinate position of the first and second sensing means in three space relative to a coordinate system of the work site, and the laser position receivers measure the coordinate position of the first and second sensing means in an elevational direction relative to the work site.

13. An apparatus, as set forth in claim 2, wherein the work implement is an earthworking blade having a cutting edge, first and second sides, and first and second spaced corners defined by the first and second sides and the cutting edge, said first and second points being located at the first and second corners, said first receiving means being located along a first line extending substantially perpendicularly to said cutting edge, and said second receiving means being located along a second line extending substantially perpendicularly to said cutting edge.

14. A machine having a frame and a work implement movably connected to the frame, comprising:

first receiving means for receiving electromagnetic radiation delivered from a plurality of remote locations and responsively producing a first position signal, said first receiving means being connected to said work implement and being at a preselected location relative to said work implement spaced from a first preselected point location on the work implement;

second receiving means for receiving electromagnetic radiation delivered from said plurality of remote locations and responsively producing a second position signal, said second receiving means being connected to said work implement and being at a preselected location relative to said work implement spaced from a second preselected point location on the work implement, said second receiving means being spaced a preselected distance from said first receiving means and said first point on the work implement being spaced a preselected distance from said second point on the work implement;

means for sensing a change in the pitch angle of the work implement and delivering a responsive pitch angle signal;

computer means for receiving said first and second position signals and said pitch angle signal, determining a current positions of the first and second points in a local coordinate system related to the machine based on said pitch angle signal, determining first and second current coordinate positions of the first and second receiving means in a site coordinate system, determining a midpoint located along a substantially straight line passing between first and second previously defined coordinate positions of the first and second receiving means in the site coordinate system, determining a first vector extending from the first current coordinate position to the second current coordinated position and a second vector extending from the first current coordinate position to the midpoint, determining local coordinate system unit vectors for the current positions of the first and second points in terms of site coordinate system unit vectors, converting the current positions of the first and second points of the local coordinate system to the site coordinate system using a cross product of vectors determined from the local coordinate unit vectors defined in terms of the site coordinate system unit vectors, and storing the converted current positions of said first and second points in the site coordinate system.

15. An apparatus, as set forth in claim 14, wherein said first and second receiving means each include a global position receiver.

16. An apparatus, as set forth in claim 15, wherein said first and second receiving means each include a laser position receiver.

17. An apparatus, as set forth in claim 16, wherein said laser position receiver of the first receiving means being mounted on said implement at said first location, said laser position receiver of the second receiving means being mounted on the implement at said second location, said global position receiver of the first means being connected to the laser position receiver of the first means, and said global position receiver of the second means being connected to the laser position receiver of the second means.

18. An apparatus, as set forth in claim 17, wherein said global position receivers measuring the coordinate position of the first and second sensing means in three dimensional space relative to a coordinate system of the work site, and said laser position receivers measuring the coordinate position of the first and second sensing means in an elevational direction relative to the work site.

19. An apparatus, as set forth in claim 14, wherein said work implement including an earthworking blade having a cutting edge, first and second sides, and first and second spaced corners defined by the first and second sides and the cutting edge, said first and second points being located at the first and second corners, said first receiving means being located along a first line extending substantially perpendicularly to said cutting edge, and said second receiving means being located along a second line extending substantially perpendicularly to said cutting edge.

20. A method for determining the position of a work implement having first and second spaced apart receiving means mounted on the work implement and first and second spaced apart points located on the work implement, said work implement being movably connected to a frame of a geographic surface altering machine, comprising the steps of:

determining a current coordinate position of the first and second spaced apart receiving means in a site coordinate system;

determining a position of each of the first and second points in a local coordinate system referenced to said frame;

determining a mid point coordinate position located along a substantially straight line passing between a first and a second previously determined coordinate position of the first and second spaced apart receiving means in the site coordinate system;

determining a first vector extending between said first and second current coordinate positions and a second vector extending between said first current coordinate position and the midpoint position in the site coordinate system; and transforming the positions of the first and second points in the local coordinate system to the site coordinate system.

21. A method, as set forth in claim 20, wherein the step of transforming the positions of the first and second points includes the steps of:

defining local coordinate system unit vectors in terms of site coordinate unit vectors; and converting the first and second point positions from the local coordinate system to the site coordinate system.

22. A method, as set forth in claim 20, including the step of:

sensing a change in a pitch angle of the work implement;

determining a current position of the first and second points in the local coordinate system; and transforming the current position of the first and second points in the local coordinate system to the site coordinate system.

* * * * *